Nov. 13, 1923.

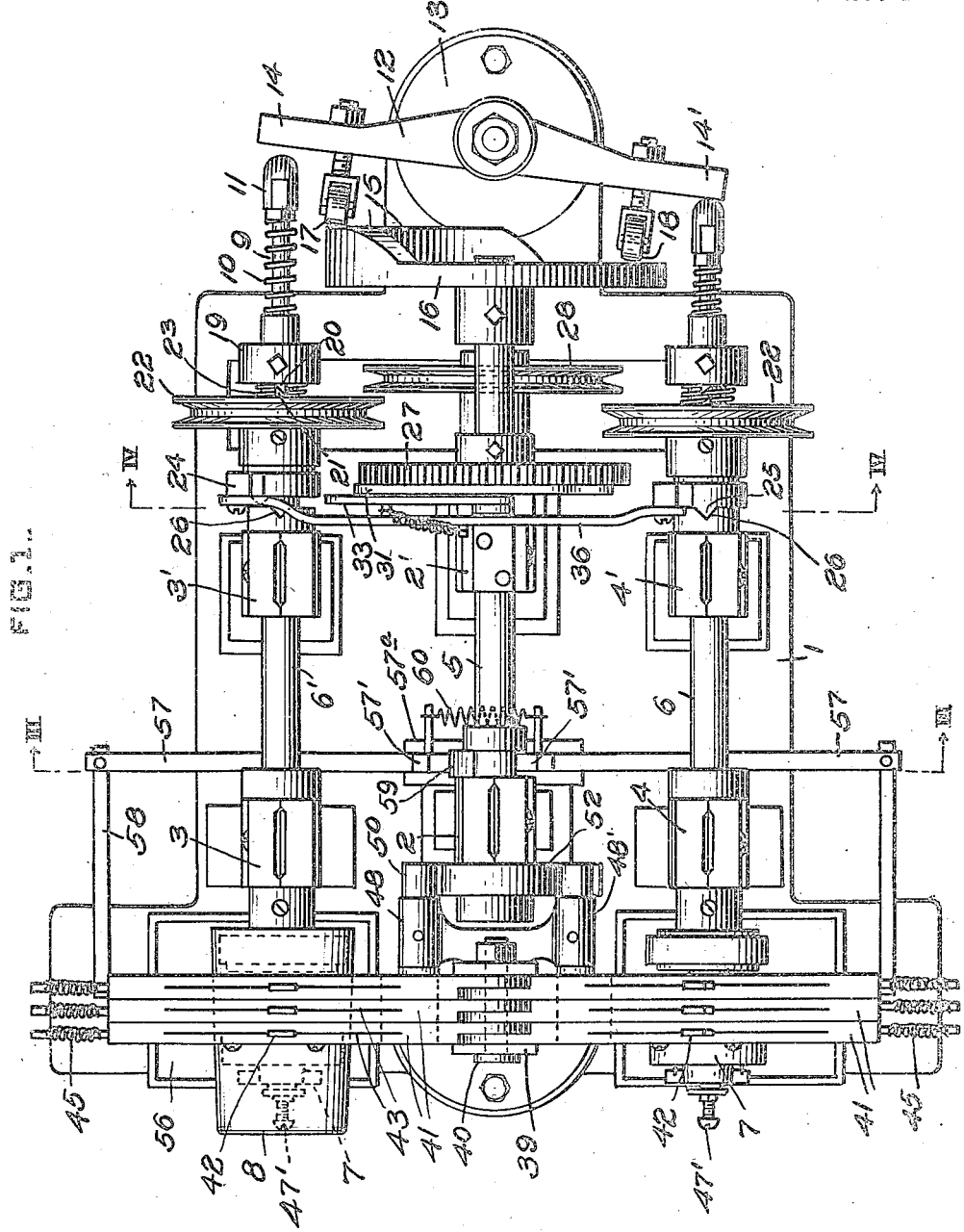

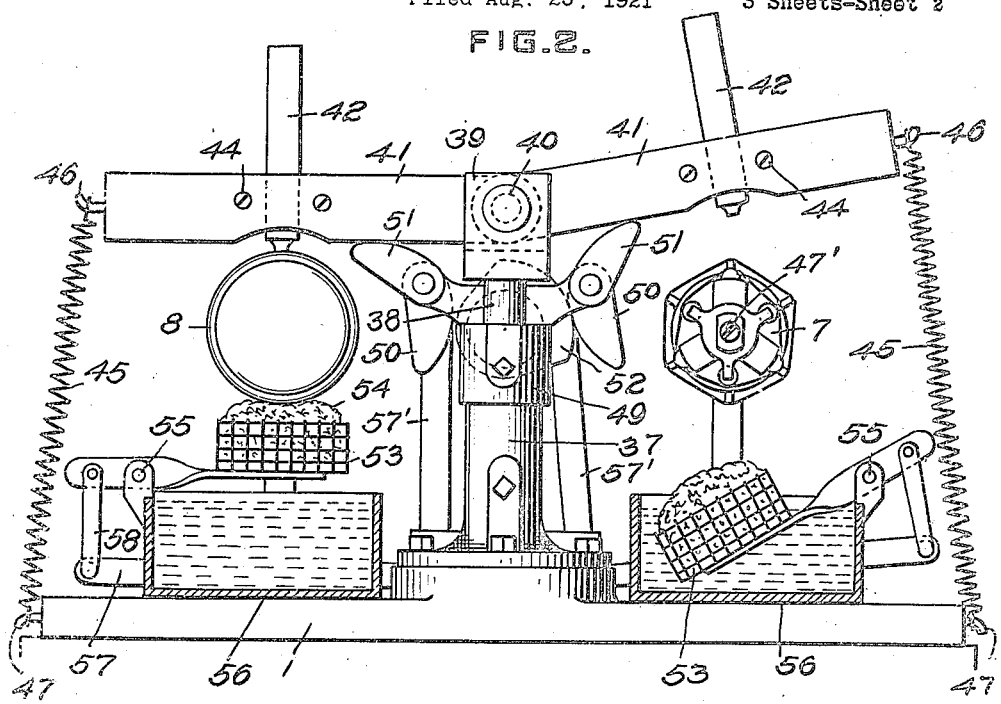
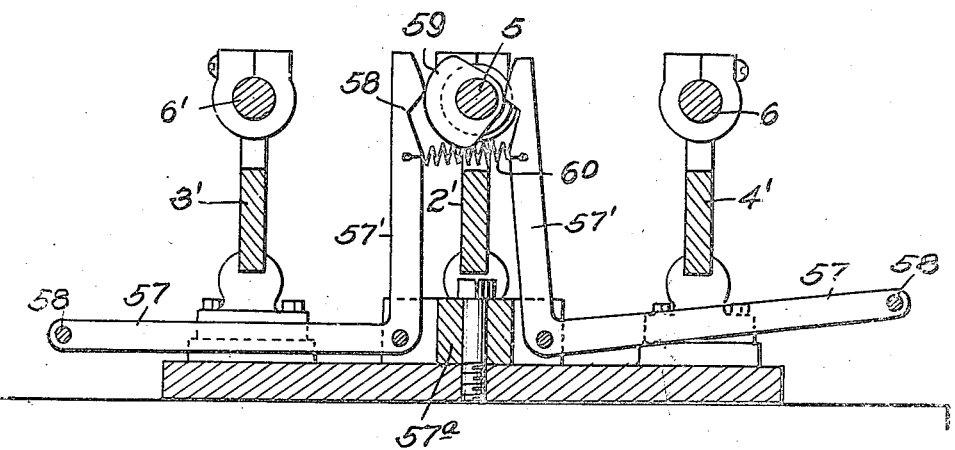

J. B. GREER

GLASS BANDING MACHINE

Filed Aug. 25, 1921     3 Sheets-Sheet 3

1,473,762

Patented Nov. 13, 1923.

1,473,762

UNITED STATES PATENT OFFICE.

JAMES BOYD GREER, OF PITTSBURGH, PENNSYLVANIA.

GLASS-BANDING MACHINE.

Application filed August 25, 1921. Serial No. 495,292.

*To all whom it may concern:*

Be it known that I, JAMES BOYD GREER, a citizen of the United States, and a resident of Pittsburgh, in the county of Allegheny and State of Pennsylvania, have invented a new and useful Improvement in Glass-Banding Machines, of which the following is a specification.

This invention relates to a glass cutting machine and more particularly to the type known as banders, being used to cut bands or rings on drinking glasses, tumblers and other glassware similarly shaped.

The object of the invention is to provide a machine of the class referred to which is strong and durable, which requires little attention on the part of the operator, which performs its cutting functions automatically and which is highly efficient in operation.

It is a special object of the invention to provide a band cutting machine which requires no attention whatever from the operator except the placing of the blanks to be cut upon the machine and the removal of the finished article after the cutting has been completed.

It is also a further special object to provide such a machine which is capable of cutting various designs of bands by the mere substitution of suitable cutting elements, the entire cutter being removable as a unit so that a change from one design to another may be made in a minimum period of time, which cutter may be accurately adjusted while removed from the machine, thus preventing a shutting down of the whole machine for such purpose.

Other special objects of the invention are to provide a bander having a plurality of independently operating cutter carrying arms which automatically accommodate themselves to irregularities in the article being cut and which may be used either singly or in multiple, and to provide means on the chuck cooperating with the arms so that adjustment may be made to cause the arms of the several chucks, whether on the same machine or on a similar machine, to contact the article being cut at corresponding points.

It is still a further object to provide a bander which is continuous and smooth in operation, that is, in which an article is being constantly operated upon at all times so that a substantially constant load is placed upon the driving means.

These and other objects will more clearly appear from the following description taken in connection with the appended claims.

Figure 4:
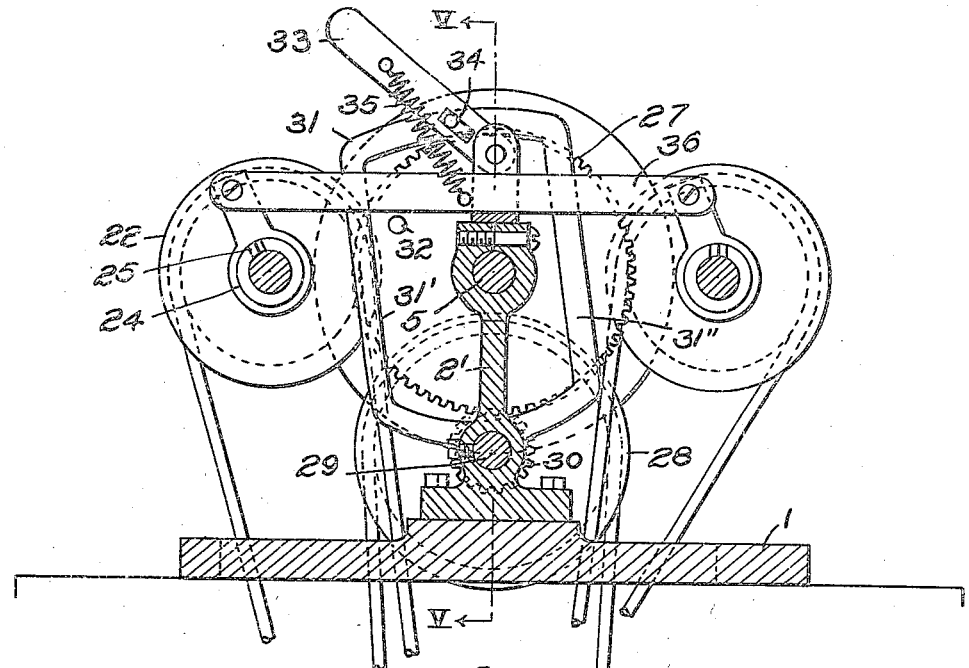
Figure 5:
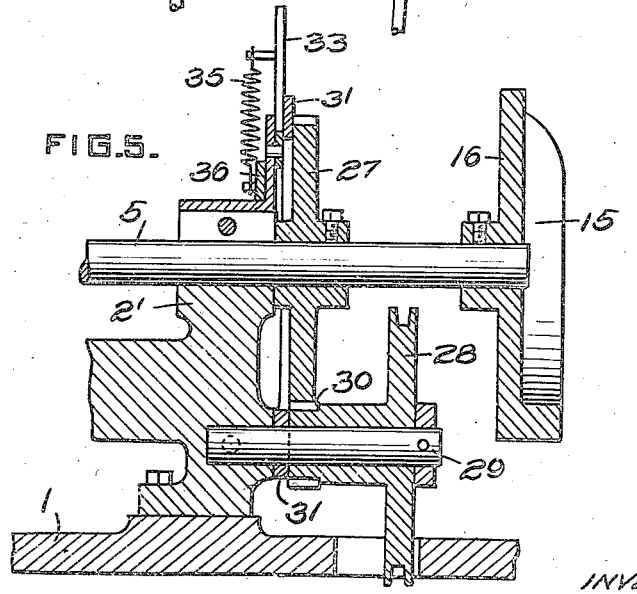

Like reference characters are used to denote similar parts throughout the several views of the drawings in which Fig. 1 is a plan view of a machine showing an embodiment of my invention; Fig. 2 a front elevation with parts in section of the machine illustrated in Fig. 1; Fig. 3 a transverse vertical sectional view taken on the line III—III of Fig. 1; Fig. 4 a vertical transverse sectional view taken on the line IV—IV of Fig. 1; and Fig. 5 a transverse sectional view taken on the line V—V of Fig. 4.

The embodiment of the invention illustrated comprises a base plate 1 near the center of which are located the bearing standards 2, 2' and disposed at its sides are the bearing standards 3, 3' and 4, 4'. A cam shaft 5 is journalled in the standards 2, 2', and supported by the side standards 3, 3' and 4, 4' are the respective chuck shafts 6 and 6' to which are attached the chucks 7 and 7'.

The chucks and chuck shafts are identical in construction, being merely oppositely disposed with respect to the cam shaft 5 and only one shaft need be described in detail. No novelty is claimed in this case for the particular chuck shown, except the adjusting means for cooperating with the cutter carrying arms, the chucks being of the expanding and contracting type so as to securely grip an ordinary drinking glass or tumbler 8 when in its expanded condition, but allow removal of the glass or tumbler when the chuck is contracted. The means for actuating the chucks consists of a rod 9 which extends through the chuck shaft and is biased toward its gripping position by the spring 10 and is provided with an adjusting nut and contact piece 11 at its outer end.

A rocking cross head or beam 12 is pivotally mounted upon the upper end of a standard 13 and the opposite ends 14, 14' are adapted to bear against the contact pieces 11 of the chuck rods to alternately actuate the same, each end of the member 12 being forced outwardly and held out of contact with one contact piece 11 to expand the chuck while the opposite end is forced inwardly to contact the remaining one and contract its chuck. Such movement occurs during each revolution of the cam shaft being effected by the cam 15 on cam disk 16, said cam extending throughout substantially half the circumference of the disk and abutting the anti-friction rollers 17 and 18 mounted on the beam 12.

19 is a clutch collar fixed to the shaft 6' and carries the clutch tooth 20 which cooperates with clutch tooth 21 attached to the sheave 22 loosely mounted and having free longitudinal movement upon the shaft, and tending to move in a direction to disengage the clutch teeth under the influence of the coil spring 23. Abutting the boss of the sheave 22 is a collar 24 also loosely mounted and having free longitudinal movement upon the chuck shaft, and which is provided with an integral cam tooth 25 cooperating with the cam slot 26 formed in the bushing of bearings 3' and 4'. It is obvious that when the tooth 25 registers with the slot 26 as shown in the lower portion of Fig. 1, the spring 23 will separate the clutch teeth 20 and 21 in which event turning of the sheave 22 will not rotate the chuck shaft, but when the collar 24 is moved to the position shown in the upper part of Fig. 1 the clutch members will be engaged and movement of the sheave will be transmitted to its shaft.

The means for alternately shifting the said clutches comprises a gear-wheel 27 fixed to cam shaft 5 and which is driven from the sheave 28 journalled upon the stub shaft 29, the hub of the shaft being provided with a pinion 30 meshing with gear 27. Pivotally mounted upon the stub shaft 29 between pinion 30 and the standard 2' is a yoke 31 which is adapted to be shifted to either side of the standard 2' by a pin 32 projecting from the face of gear 27 which alternately contacts the arms 31' and 31" of the yoke as clearly shown in Fig. 4. An arm 33 is pivoted to the upper end of standard 2' and has a pin and slot connection with the yoke as indicated at 34. A spring 35 is connected at one end to the arm 33 and at its other end to a link 36, the opposite ends of which are pivotally attached to the collars 24 so as to move the same with a snap action whenever the arm 33 is moved slightly beyond the vertical plane of standard 2' by reason of the pin 33 contacting with the arms of the yoke.

Attached to the forward end of the frame 1 and midway between the chucks 7 and 7' is a standard 37 in which is mounted the rod 38 having a head 39 and pivoted in the head 39 at 40 are a plurality of cutter carrying arms 41 which overhang the chucks 7 and 7'. Each of the arms 41 is entirely independent of the other except that they have a common pivotal point and perform like functions. The several arms lie adjacent one another, as clearly shown in Fig. 1, and each carries a suitable cutting element 42. This independent pivoting permits the swinging of the arms into or out of cutting position, thus permitting the use of but a single arm or a plurality, as desired. These cutters fit openings formed in arms 41, the arms being split throughout a portion of their length as indicated at 43, thus permitting the cutters to be easily projected through the openings after which they are secured in position by tightening the binding screws 44, the binding screws of the two inner arms being counter-sunk so as not to interfere with the free movement of the same against each other. These cutters may be made of any suitable material, being preferably formed of an abrading compound which will readily cut the glass of which the tumblers 8 are made. The lower cutting edges of the cutters are shaped to correspond to the outer periphery of the tumblers to be cut, as clearly shown in Fig. 2, and may have a single cutting edge so as to form but a single groove or may be so constructed as to cut a plurality of grooves. In this way, by varying the forms of cutters and their arrangement, a number of different designs may be cut, and since the post 38 and the arms 41, together with cutters 42, constitute a cutting unit, a number of units arranged to cut various designs may be provided so that by merely substituting a new cutting unit, the operator is enabled to change from one design to another without disturbing the remaining portions of the machine or causing it to be out of operation more than the very short period required to make the substitution.

Each of the arms 41 is entirely independent of the other, as before noted, and is biased into cutting position, not only by its own weight, but by the tension of coil springs 45 attached at one end to the pins 46 projecting from arms 41, and at the other to similar pins 47 in the base plate 1. Such mounting permits the cutters to accommodate themselves to the surface being cut, regardless of its irregularities, it being well known that tumblers are neither uniform in cross section, in outline or in thickness. By mounting the parts in the manner described, it is found that uniform bands are cut regardless of the irregularities noted.

Each chuck is provided with an adjusting limiting screw 47' which contacts the bottom of the article being cut at its center, as clearly shown in Fig. 1. By properly adjusting these screws, the bands will be cut at corresponding portions regardless of the chuck on which said article is placed, and an article may be changed from one chuck to another of the same or different machines with the assurance that the cutters will always contact the article at identical points. Should a band be but partly cut on one chuck, the cutting may be completed by replacing the article on any chuck without fear that the cutters will not contact the same at the proper point.

Journalled in the outer ends 48 and 48' of a bifurcated bracket 49 are a pair of short shafts, to the opposite ends of which are attached fingers 50, 51, the former bearing against the cam 52 mounted on shaft 5 and the latter lying beneath the arms 41 and adapted to raise the same to stop the cutting action after the band has been formed.

For the purpose of moistening the tumblers 8 so that the abrasive action of the cutters 42 is enhanced and also for the purpose of removing all particles resulting from the cutting operation a moistening device is provided for each chuck shaft. It consists of a basket 53 containing an absorbent material such as a sponge 54 adapted to contact the tumbler 8 when in its raised position. The basket 53 is attached to one end of a short lever pivoted at 55 to the edge of a vessel 56 filled with water and supported upon the base plate 1, said lever being connected at its other end to a bell crank 57 by the link 58, the bell crank being pivoted to a block 57ª bolted to the base plate. The arm 57' of the bell crank extends upwardly and is provided with a cutaway portion 58 at its upper end which contacts the cam 59, on shaft 5 under the tension of a coil spring 60.

The sheaves 22 for actuating the chuck shafts and sheave 28 for rotating the cam shaft are driven by suitable belting, as illustrated in Fig. 4, from any source of power, such as a power shaft conveniently located beneath the table upon which the base plate is supported.

In place of sheaves and belting, sprocket wheels and chains may be used, and for many purposes are found to be preferable.

In operation, a blank tumbler is placed upon the chuck 7 shown at the right of Fig. 2, the said chuck being contracted to receive the same due to the forcing of its operating rod 9 inwardly by the end 14' of rocking beam 12. At this time the sheave 22 is disconnected from chuck shaft 6 and the cams upon the cam shaft are in position to cause finger 51 to lift the cutter carrying arms 41 overhanging chuck 7 to their raised position and to lower the sponge basket into the water vessel to moisten the same. While the parts associated with chuck 7 are in the positions described and, as clearly illustrated in Fig. 2, the corresponding parts associated with chuck 7' are in their active positions, the rod 9 being projected by spring 10 to expand the chuck so as to grip the blank 8, the moistening and cutting devices being in contact therewith and the clutch 20—21 being engaged so as to rotate the chuck shaft 6'. The parts associated with shaft 6' and chuck 7' remain in their active cutting positions during substantially a half revolution of cam shaft 5 at which time the cam 15 rocks the beam 12 to release the chuck rod 9 of shaft 6 and force that of shaft 6' inwardly to contract chuck 7'. Just prior to such release of chuck 7' the pin 32 on gear 27 contacts the arm 31" of yoke 31 to shift link 36 and collars 24 which disconnects the clutch 20—21 of shaft 6' and connects that of shaft 6, and simultaneously with the actuation of the clutches cam 59 actuates the bell crank lever 57 to lower the moistening device out of contact with the article being cut, and cam 52 through the connected fingers 50 and 51 lifts the arms and their attached cutters to the position corresponding to that illustrated in Fig. 2 in connection with chuck 7. In moving the several devices into cutting position, the chuck is expanded so as to grip the blank securely just prior to the lowering of the cutting arms and engagement of the clutch.

The cams are so arranged that when the devices associated with one chuck are thrown into cutting position as described, the devices associated with the other chuck are thrown out of action. In this way, the finished article may be removed and the new blank placed in position on one chuck while the cutting operation is being performed on the other, and since the chucks are alternately actuated, the one being thrown into operation at the same time the other is thrown out, the cutting process is a continuous one in which the load upon the machine is constant since one glass is being cut at all times. This assures a very smooth running of the machine, free from jerks and spasmodic fluctuations in speed of operation, which frequently results in machines in which the load varies from time to time.

It is also noted that the combined weight of the arms 41, together with the tension of springs 45, the abrasive quality of the cutters and the speed of rotation of the chucks are so proportioned that the time required to cut a finished band upon a blank allows just about sufficient time for the operator to remove a finished article and substitute a blank therefor, thus resulting in a highly efficient operation for the purpose desired.

I claim:

1. A cutting machine comprising an intermittently rotating chuck adapted to receive the article to be cut, means for actuating the same, a cutter carrying arm mounted adjacent said chuck, a cutter thereon, said cutter arm being pivoted to a supporting head, said head and cutter arm being freely removable from the machine as a unit, and automatic means for moving the cutter into and out of engagement with the said article.

2. A cutting machine comprising an intermittently rotating chuck adapted to receive the article to be cut, means for actuating the same, a plurality of independently movable cutter arms mounted adjacent said chuck, a cutter fixed to each of said arms, said cutter arms being pivoted to a single supporting head, said head and arms being freely removable from and replaceable on the machine as a unit, and automatic means for moving the cutters into and out of engagement with the said article.

3. A cutting machine comprising a frame, a pair of chuck shafts mounted therein, chucks on said shafts adapted to receive an article to be cut, means for driving the chuck shafts, a cam shaft also mounted in the frame, clutches between said driving means and chuck shafts, cutter carrying arms mounted adjacent the chucks, cutters thereon and cams on said cam shaft for actuating the said clutches and arms.

4. A cutting machine comprising a frame, a pair of chuck shafts mounted therein, chucks on said shafts adapted to receive an article to be cut, means for driving the chuck shafts, a cam shaft also mounted in the frame, clutches between said driving means and chuck shafts, cutter carrying arms mounted adjacent the chucks, cutters thereon, an adjustable stop on the chuck for positioning the article being cut with respect to said arms, and cams on said cam shaft for actuating the said clutches and arms.

5. A cutting machine comprising an intermittently rotating chuck adapted to receive the article to be cut, means for actuating the same, a standard disposed adjacent the chuck, a supporting head removably mounted in the standard, a plurality of independently movable cutter arms pivoted to said head and overhanging the chuck whereby to be urged theretowards under the influence of gravity, a cutter fixed to each of said arms, said head and cutter arms being removable from the machine as a unit, and automatic means for moving the cutters into and out of engagement with the said article.

6. A bander comprising a frame, a cam shaft mounted in the frame, chuck shafts mounted on opposite sides of said cam shaft having chucks thereon adapted to hold an article to be cut, driving means for said shafts, a clutch on each of the chuck shafts, means on the cam shaft for alternately connecting and disconnecting the said clutches, means for alternately actuating the chucks, a pivoted cutter arm carrying a cutter adjacent each of the chucks, and means for moving the said arms into and out of contact with the article on the said chucks.

7. A cutting machine comprising a frame, a cam shaft mounted in the frame, chuck shafts mounted on opposite sides of said cam shaft having chucks thereon adapted to hold an article to be cut, driving means for said shafts, a clutch on each of the chuck shafts, means on the cam shaft for alternately connecting and disconnecting the said clutches, means for alternately actuating the chucks, a removable cutting device formed of a series of pivotally supported arms carrying the cutters mounted in the frame adjacent the chucks and overhanging the chucks, and means for moving the arms into and out of engagement with the article on the said chucks.

8. A band forming machine comprising a frame, a cam shaft journalled in the frame, chuck shafts at opposite sides of the cam shaft and having chucks at one end adapted to hold the article being cut, the operating rods of which project from the opposite ends thereof, a pivoted cross head the ends of which abut the operating rods to alternately actuate the same, driving means for the said shafts, clutches interposed between the driving means and chuck shafts, a standard on the frame disposed between the chucks, a cutting device removably mounted in the standard and formed of a plurality of independent cutter bearing arms overhanging the chucks and biased theretowards, and means on the cam shaft for alternately actuating the said operating rods, the clutches and the said cutter bearing arms of the respective chuck shafts.

9. A cutting machine comprising a frame, a cam shaft journalled in the frame, chuck shafts at opposite sides of the cam shaft and having chucks at one end adapted to hold the article being cut, the operating rods of which project from the opposite ends thereof, a pivoted cross head the ends of which abut the operating rods to alternately actuate the same, driving means for the said shafts, clutches interposed between the driving means and chuck shafts, a standard on the frame disposed between the chucks, a cutting device removably mounted in the standard and formed of a plurality of independently pivoted cutter bearing arms overhanging the chucks and biased theretowards, means adapted to be moved into contact with the article being cut to moisten the same and means on the cam shaft for alternately actuating the said operating rods, the clutches, the cutter bearing arms and the said moistening means of the respective chuck shafts.

In testimony whereof, I sign my name.

JAMES BOYD GREER.

Witness:
EDWIN O. JOHNS.